Nov. 22, 1966 T. E. PIAZZE 3,287,195
METHOD OF PRESSURE WELDING THERMOPLASTIC FILM
Filed Nov. 17, 1961 2 Sheets-Sheet 1
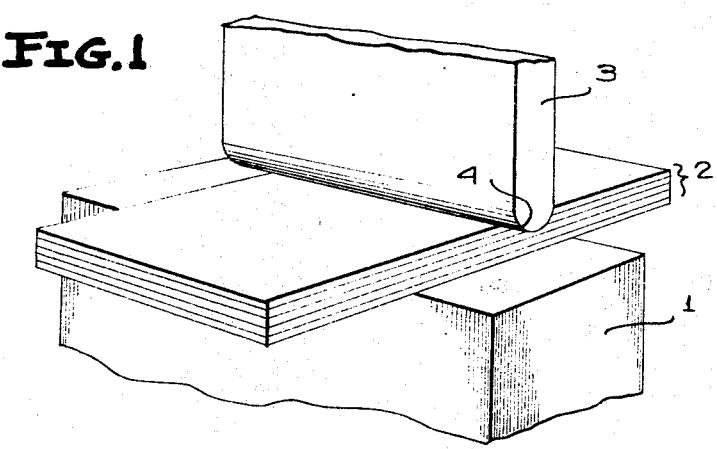
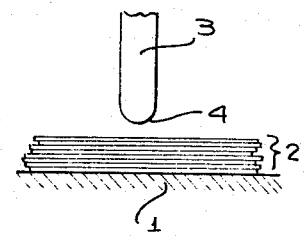
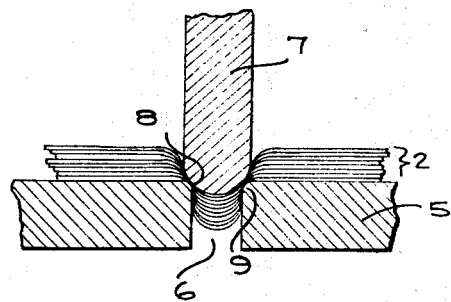
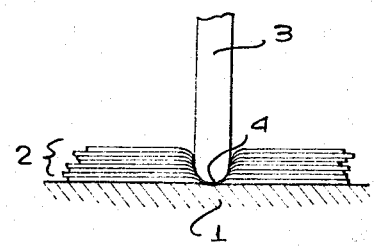
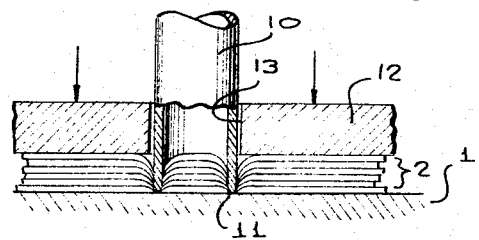
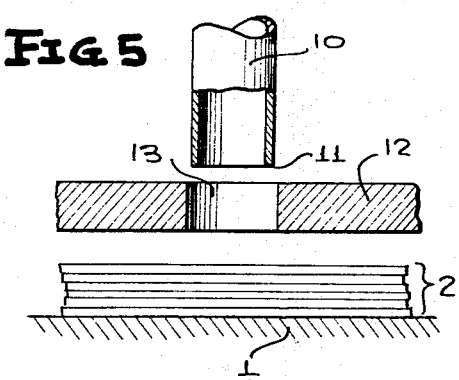
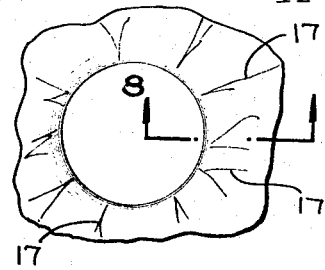
INVENTOR
THOMAS E. PIAZZE
BY Mason, Porter, Diller & Stewart
ATTORNEYS Nov. 22, 1966 T. E. PIAZZE 3,287,195
METHOD OF PRESSURE WELDING THERMOPLASTIC FILM
Filed Nov. 17, 1961 2 Sheets-Sheet 2
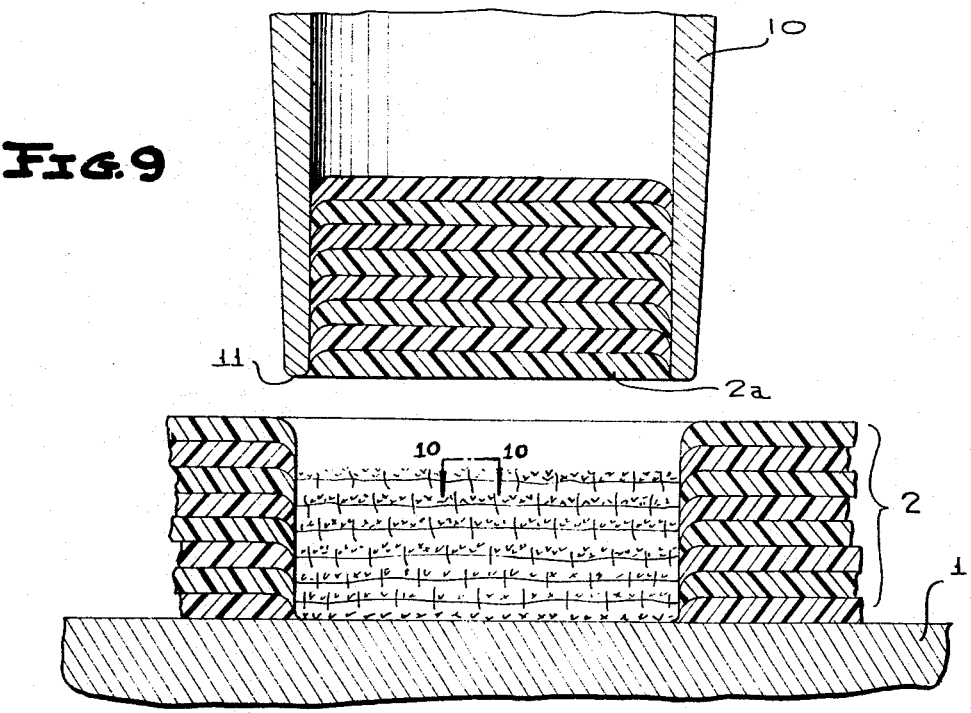
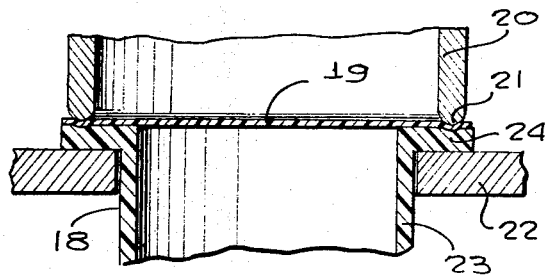
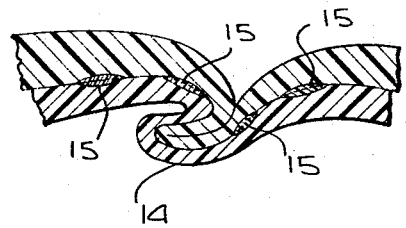
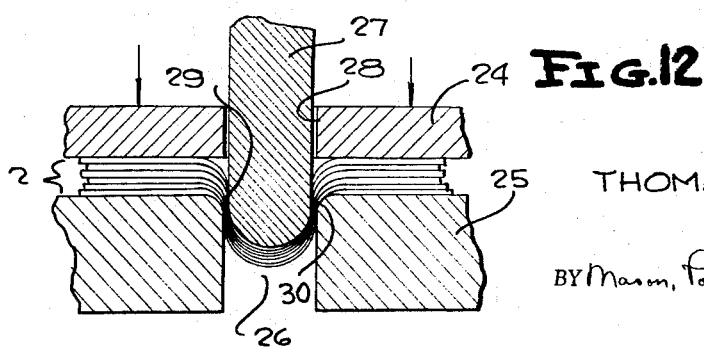
INVENTOR
THOMAS E. PIAZZE
BY Mason, Porter, Diller & Stewart
ATTORNEYS

United States Patent Office 3,287,195
Patented Nov. 22, 1966

3,287,195
METHOD OF PRESSURE WELDING THERMOPLASTIC FILM
Thomas E. Piazze, Mount Vernon, Ohio, assignor to Continental Can Company, Inc., New York, N.Y., a corporation of New York
Filed Nov. 17, 1961, Ser. No. 153,148
12 Claims. (Cl. 156—251)

This invention primarily relates to a method of forming joints between a plurality of thermoplastic sheets and the joints formed in accordance with the method. This invention has particular utility when such sheets are being fed in overlying and registered position to a bag filling apparatus.

Prior to the method disclosed in the present invention several ways of aligning the stack of thermoplastic bags and maintaining such bags in alignment for feed into an automatic bag filling machine, were known. One of the methods that has been used is that of aligning a stack of bags, e.g. polyethylene, and piercing the stack in the lip area with a hot needle. The bags may be pierced in one or more places as desired. This method has been found very satisfactory to maintain the stack of bags in alignment with each other; however, it has been found in practice that the hot needle method forms a chimney of weld surrounding the pierced opening. When the bags are stripped, normally one by one, from the machine, the bag material breaks away from this chimney, leaving the chimney projecting above the new bag level. This resultant chimney causes difficulty in stripping off the subsequent bags and also interferes with the operation of the gripper bar which should press down upon the lip of the uppermost bag as evenly as possible.

Another way of maintaining the stacked sheets in alignment with each other that has been previously practiced, is to fasten such together with metal staples or other like fastening means. This, although being a most simple and obvious expedient has not been met with a great deal of acceptance as there is always present the danger of a staple or other fastening means finding its way into the bag, which may in many cases contain a food product.

The general object of the present invention is the provision of a temporary seal or joint between a plurality of thermoplastic sheets so that said sheets may be maintained in overlying and registered position.

Another object of the present invention is to provide a method whereby a plurality of thermoplastic sheets disposed in overlying and aligned position may be temporarily held together in such a registered position.

A further object of the present invention is to provide a method whereby a thin sheet of thermoplastic material may be temporarily secured to a thicker underlying sheet of similar material.

Another object of the present invention is to provide a temporary joint between a plurality of overlying and aligned sheets of thermoplastic material wherein said joint comprises either slight mechanical interlocks or slight heat welds between the overlying sheets along sever lines thereof.

Another object of the present invention is to provide a temporary joint between a plurality of overlying and aligned sheets of thermoplastic material wherein said joint comprises slight mechanical interlocks and slight heat welds between adjacent sheets along sever lines thereof.

Another object of the present invention is to provide a method whereby a rounded edge punch element is forced into and through a plurality of overlying and registered thermoplastic sheets so as to form a severed edge therethrough and thus provide slight mechanical interlocks and slight heat welds along said edge.

Another object of the present invention is to provide a method whereby a thin sheet of thermoplastic material may temporarily be secured to an underlying thermoplastic sheet in which a rounded punch element is quickly brought down and through such sheets so as to form a severed edge therethrough and thus temporarily secure the upper sheet to the underlying bottom sheet by means of slight mechanical interlocks and slight heat welds formed by the punch action along the severed edge.

Other objects and advantages of the invention will be pointed out in the following detailed description or will become apparent therefrom, said description having reference to the accompanying drawings, in which:

FIGURE 1 is a pictorial view of one form of the herein included invention where a plurality (merely a few sheets have been shown for clarity) of sheets are placed upon a supporting structure and a rounded edge punch element positioned thereabove.

FIGURE 2 is a side view of FIGURE 1 on a reduced scale.

FIGURE 3 is a side view of FIGURE 1 similar to FIGURE 2 but showing the punch element at its downwardmost position where it just contacts the supporting member and thus provides for the severance of the plurality of sheets.

FIGURE 4 is a fragmentary transverse vertical sectional view of a modified form of the present invention wherein the supporting member has an opening defined therein and the punch element is placed in overlying and aligned relation to the opening.

FIGURE 5 is a fragmentary elevational view with parts having been broken away and shown in section of another modified form of the present invention wherein a press plate having an opening therein is disposed above a plurality of sheets and above the press plate and in overlying relationship to the opening, a rounded edge hollow punch member is disposed.

FIGURE 6 is also a fragmentary elevational view with parts broken away and shown in section of the modified form of the invention shown in FIGURE 5 wherein the press member is shown in intimate contact with the plurality of sheets and the overlying punch element has reached its most downward position.

FIGURE 7 is a plan view of the plurality of sheets depicted by FIGURE 6 and the opening formed therein.

FIGURE 8 is a partial vertical sectional view on an enlarged scale and taken along the line 8—8 of FIGURE 7.

FIGURE 9 is a vertical sectional view on an enlarged scale of a modified form of the invention shown in FIGURE 5 showing a hollow punch withdrawn from the plurality of thermoplastic sheets after it has been utilized to sever the sheets so as to produce an opening therein.

FIGURE 10 is a horizontal sectional view on an extremely large scale and taken along line 10—10 of FIGURE 9 and shows both the heat welds and the mechanical interlocks thereof.

FIGURE 11 is a partial vertical sectional view of another modified form of the present invention wherein a thin thermosplastic sheet may be temporarily secured to a thicker underlying thermoplastic sheet, the rounded punch element being shown at its initial point of contact with the overlying sheet.

FIGURE 12 is a fragmentary transverse vertical sectional view of another modified form of the present invention similar to FIGURE 4 wherein the punch element is of a lesser cross-sectional area than the support defined opening and wherein a press plate having an opening therein engages the stack of sheets.

Referring to the drawings with particular reference to FIGURES 1 through 3 thereof, a stack of thermoplastic sheets or bags is placed upon supporting structure 1 which may be composed of a hard plastic, metal or any other material which exhibits the properties of being relatively inflexible and wear-resistant. The stack, generally designated 2, is comprised of a plurality of sheets or bags (as many as 200 double-sheeted bags has met with operational success) and is placed upon support member 1 in the desired aligned position. A punch element 3 having a rounded and smooth lower end 4 is rapidly brought down against and through the stack 2 so as to kiss the upper surface of the underlying support member 1 and to sever the overlying sheets including the lowermost sheet or bag of the stack. The downward movement of the punch may be controlled by known means such as stops and may be actuated by known fast-acting mechanisms such as cam movements. As the punch passes through the sheet stack the material about the periphery of the punch is stretched thin by the extrusion forces acting thereon. The thus produced thin peripheral edges of the severed sheets are forced downwardly by the wiping action of the punch 3 thereupon and are severely worked to produce an almost instantaneous increase in temperature in the thinned out plastic edges. This instantaneous increase in temperature has been found to be sufficient to form slight heat welds between the overlying sheets proximal to their severed edges. This is, of course, possible through the thermoplastic nature of the material being worked upon. At the same time that these slight heat welds are being produced, slight mechanical interlocks are also being formed between the overlying sheets by the action of the downwardly moving punch 3 forcing the extruded thin edges of the individual sheets upon those underlying them. The thinned out edges of the individual sheets or films are, upon the action of the downwardly moving punch 3, bent downwardly over each other and form nested flanges about the opening produced in the sheet stack. It is this combination of mechanical interlocks and heat welds that forms the temporary securing joints between the overlying individual sheets in an aligned sheet stack. The thus formed joints retain the sheet stack 2 in superposed relationship and prevent skewing or misalignment of an individual sheet or sheets from the remainder of the sheet stack 2. Of course, it is obvious that if several holes are formed within a sheet stack or if an entire edge or great portion thereof is severed according to the instant invention more assurance of keeping the sheet stack 2 in proper alignment is obtained.

As evidenced from the above description, the herein novel method and the joint produced therefrom provide a simple way of holding a stack of sheets in aligned position by the slight mechanical interlocks and slight heat welds formed about the severed edge of said stack. Since the welded portions are slight and only extend a short distance away from the severed edge, being for the main part in the thinned or extruded edges thereof, an individual sheet or bag may be easily removed or stripped from the remaining stack without exhibiting any tendency to tear. Also, because of the placement and extent of such welds, no objectionable chimney of fused or welded material as in the hot needle method is present. It has been found in some cases that either the mechanical interlocks or the heat welds, themselves, will be enough to achieve the desired temporary joint between individual overlying sheets or bags within the stack.

Another modification of the present invention is shown by FIGURE 4, wherein a plurality of stacked and aligned sheets are placed upon a supporting member 5 having an opening 6 therein. A punch 7 is positioned so as to overlie the opening 6 formed within the support member. It will be noted that the cross-sectional area of the punch 7 is greater than that of the opening formed within the support member 5 and that both the contacting edges 8 of the punch 7 and the opening defining edges 9 of the support member 5 are rounded. Upon the downward movement of the punch 7 the overlying sheets are extruded thin adjacent the periphery of the punch and are forced downwardly upon each other to form a nested and flanged relationship with each other. In particular with the instant embodiment the portions of these stacked sheets underlying the punch will be forced into the opening 6 defined by the supporting member 5. It should be also noted that the extent of the downward travel of the punch member 7 is just enough to kiss the rounded support member edges 9 and to completely sever the overlying sheets including the bottommost sheet of the stack 2. In this embodiment, as in the previously disclosed embodiment (FIGURES 1 through 3), essentially the same slight mechanical interlocks and slight heat welds are formed within the severed edge portions of the individual sheets. It should be also noted that the particular shape of the punch 7 is not critical and that it may take many forms, so long as the working edges thereof are smooth and rounded as opposed to a conventional cutting edge.

In another embodiment as shown in FIGURES 5 through 7, a hollow punch 10 with rounded working edges 11 is quickly passed through a stack 2 of overlying sheets supported upon the member 1 so that the working edges 11 just barely kiss the supporting member 1 and cleanly sever the overlying sheets including the bottommost sheet. A pressure applying member 12 having a punch guiding opening 13 therein may be provided to assure most efficient results and to reduce the care involved in the above punching operation. The punch 10 may be of different forms such as star-shape, rectangular, elliptical, round, etc. as desired; the particular over-all shape being no part of the invention. The downwardly moving punch 10 severs the thus thinly extruded edge portions of the sheets that surround the area worked upon by the punch, thus forming the overlying flange and nested arrangement previously referred to and specifically shown in FIGURE 8. The instantaneous high heat developed at the extremely thin severed edge portions will produce the slight heat welds between the overlying sheets, and the action of the downwardly moving punch provides the slight mechanical interlocks.

The nature of the mechanical interlocks and the heat welds may be found in more detail by reference to FIGURES 9 and 10, wherein the slight mechanical interlocks (one only having been shown for clarity) are generally designated 14 and the heat welds as 15. While the showings of FIGURES 9 and 10 have special relation to the modified punch form of FIGURES 5 through 7, the basics of all the herein disclosed embodiments are essentially the same and valid explanation of all the embodiments may be had from reference to FIGURES 9 and 10. The severed vertical portion of FIGURE 9 has separate longitudinally disposed and transversely spaced lines and X's marked thereon which designate respectively the mechanical interlocks and the heat welds. It is believed that the nature of the mechanical interlocks is adequately clear from a perusal of FIGURE 10, noting the position of the section line wherefrom this figure has been taken. An interlock of a similar nature is evidenced when one takes two overlying sheets of paper (two being taken in the emphasis of clarity as has been done in FIGURE 10) and moves one double portion downwardly and to the right of a mid-point while moving a second double portion spaced and in line with the first double portion upwardly and to the left of said mid-point and thereupon squeezing the now four sheet thickness at said mid-point together.

As illustrated by reference numeral 17 in FIGURE 7, slight folds or puckers will be present along the flat surface of the sheets as viewed perpendicular to their flat surfaces, such puckers normally emanating from the points of slight mechanical interlock. This visual phenomenon is usually present, but need not be, as the mechanical interlocks can be present without the presence of such puckers, especially when the temporary joint along the severed edge is formed in straight line fashion as opposed to circular or multi-angle severances.

When the punch is of the female type, that is, having a hollow portion defined by surrounding edge portions, it will be noted as shown in detail in FIGURE 9 that the plastic material 2a bounded by the severed edges will be forced up into the punch cavity upon its downward stroke and thus upon the upward movement of the punch be carried away therein. Naturally, either upon each upward stroke or prior to the forcing downward stroke, the severed material 2a carried upward in the punch cavity should be removed therefrom. Sometimes, of course, several cycles may be completed without removal of the severed material; that is, upon each subsequent stroke the severed waste material is forced further and further up into the hollow punch cavity. Conventional means (not shown), such as compressed air or other fluid means, as well as mechanical means, may be provided for removing the severed material 2a.

In the modification shown in FIGURE 11, means is provided whereby an underlying thermoplastic sheet 18 may be temporarily connected by mechanical and heat-weld means to an overlying sheet 19 of thermoplastic material. This modification may be practiced in accordance with the previously mentioned inventive concepts and it will be understood that upon the downward movement of the punch element 20, which has rounded edges 21, the top sheet 19 will be immediately extruded downwardly to form a very thin severed edge thereof, and that upon further downward movement of the punch element towards its underlying support member 22 that the underlying thermoplastic sheet 18 will also be extruded thin at its severed edges upon the completed downward movement of the rounded punch 20. That is, when the punch 20 strikes or kisses the support 22, the sheets 18 and 19 will become temporarily secured together by the presence of the slight mechanical interlocks and slight heat welds present in the previously explained embodiments of the present invention. This present modification (FIGURE 11) has particular utility in forming material retaining or protective covers on containers and the like and therefore the underlying sheet 18 may be shaped so as to present a body portion 23 having a peripheral flange 24. The sheet 18 may also be conveniently of a greater thickness than the sheet 19.

Still another modification of the present invention is shown in FIGURE 12, wherein a plurality of stacked and aligned sheets are held under compression while being punched by a compression applying member 24 which is similar to the member 12 described in conjunction with the embodiment shown in FIGURES 5 and 6. The stack 2 of sheets is placed upon a supporting member 25 having an opening 26 therein. A punch 27 is positioned so as to overlie the opening 26 formed within the support member and so as to pass through the punch guide opening 28 formed within pressure applying member 24. It should be noted that the cross-sectional area of the punch 27 is slightly less than that of the opening 26 formed within the support member and that both the edges 29 of the punch 27 and the edges 30 of the support member 25 are generously rounded. The operation of this modified structure functions in a manner similar to the modifications previously explained. The downward movement of the punch 27 through the opening 28 into contact with the stacked sheets forces portions of the underlying stacked sheets into the opening 26. The stacked sheets are held under compression by the member 24. This downward movement of the punch 27 causes overlying sheets to be extruded thin adjacent the periphery of the punch and forces the sheets downwardly upon each other to form the previously referred to nested and flanged arrangement. The punch, upon passing into the opening 26, severs the overlying sheets through the coaction of rounded edges 29 and 30. A pressure applying member similar to 24 can, of course, be similarly utilized in operation with the previously described modification shown in FIGURE 4.

Film or sheet material of the thermoplastic type that may be heat-sealed may be utilized in the herein disclosed invention. Mylar (polyethylene terephthalate), Saran (vinylidene chloride-vinyl chloride copolymer) and both high and low density polyethylene are specific examples of polymeric sheet materials that have met with particular success.

It will become obvious from a reading of the above description of the present invention that the advantages of the prior art methods are maintained, but not at the expense of their disadvantages. It can be seen that the herein described method and the temporary joint produced thereby, provides an easy, simple and inexpensive way of maintaining a stack of thermoplastic sheets together and in aligned position. This invention has particular utility in bag dispensing devices, but is not limited thereto.

What is claimed as new is:

1. A method of forming a joint between superposed thermoplastic sheets comprising the steps of (1) placing a plurality of thermoplastic sheets in stacked relation to each other on a support member; (2) applying a hollow punch member having a rounded working edge to a localized area of said stacked sheets; (3) joining portions of at least some of said sheets in interlocked relation by application of force through said punch member (4) forming heat welds between said interlocked portions by continued application of force through said punch members; (5) at least partially severing said stacked sheets in said localized area from the remaining area of the stacked sheets.

2. The method of claim 1 wherein said application of force is effected by moving a punch element toward a support element with the stacked sheets therebetween.

3. The method of claim 1 comprising the further step of punching a hole through said joined and heat welded sheets in the area of said joining and heat welding substantially simultaneously with said interfolding and heat welding.

4. The method of claim 3 wherein said application of force and punching operations are performed by moving a punch element toward a support element with the stacked sheets therebetween.

5. The method of claim 2 wherein said application of force comprises pressing and only partially severs said stacked sheets in the pressed area.

6. The method of claim 2 wherein said force application comprises pressing and entirely severs said stacked sheets in the pressed area.

7. The method of claim 2 wherein said force application comprises pressing and partially severs a substantially circular hole in the pressed area of the stacked sheets.

8. The method of claim 2 wherein said force application comprises pressing and entirely severs a substantially circular hole in the pressed area of said stacked sheets.

9. The method of claim 5 wherein the partially severed portions of the stacked sheets are received within a hollow portion of said punch member.

10. The method of claim 6 wherein the entirely severed portions of the stacked sheets are received within a hollow portion of said punch member.

11. A method of forming a joint between superposed thermoplastic sheets comprising the steps of (1) placing a plurality of thermoplastic sheets in stacked relation to each other on a support member; (2) applying pressure through a pressure member to said stacked sheets; (3) applying a punch member to a localized area of said stacked sheets through a hole in said pressure member; (4) joining portions of at least some of said sheets in interlocked relation by application of force through the punch member; (5) forming heat welds between said interlocked portions by continued application of force through said punch members; (6) at least partially severing said stacked sheets in said localized area from the remaining area of said stacked sheets; and (7) receiving said at least partially severed portion of said stacked sheets within a hollow portion of said punch member.

12. The method of claim 11 wherein all of said steps are performed substantially simultaneously.

References Cited by the Examiner
UNITED STATES PATENTS

| | | | |
|---|---|---|---|
| 515,746 | 3/1894 | Cameron | 83—694 |
| 1,177,005 | 3/1916 | Zimmerman | 156—510 |
| 2,076,079 | 4/1937 | Gammeter | 156—251 |
| 2,232,640 | 2/1941 | Schwartzman | 156—251 |
| 2,517,362 | 8/1950 | Thompson | 83—694 |
| 2,618,311 | 11/1952 | Parker | 156—512 |
| 2,956,674 | 10/1960 | Weilby | 206—57 |
| 2,973,797 | 3/1961 | Sylvester | 156—251 X |
| 3,021,947 | 2/1962 | Sylvester | 206—57 |
| 3,138,985 | 6/1964 | Mills | 156—510 |

FOREIGN PATENTS 36,927 5/1928 France.
(Addition of No. 662,888)

EARL M. BERGERT, *Primary Examiner.*

D. J. DRUMMOND, *Assistant Examiner.*